Patented Aug. 25, 1925.

1,551,176

UNITED STATES PATENT OFFICE.

FREDERICK W. SKIRROW AND GEORGE O. MORRISON, OF SHAWINIGAN FALLS, QUEBEC, CANADA, ASSIGNORS, BY MESNE ASSIGNMENTS, TO CANADIAN ELECTRO PRODUCTS COMPANY, LIMITED, OF MONTREAL, QUEBEC, CANADA.

METHOD OF MAKING ALDEHYDE AMMONIA.

No Drawing.  Application filed November 8, 1920.  Serial No. 422,666.

*To all whom it may concern:*

Be it known that we, FREDERICK W. SKIRROW and GEORGE O. MORRISON, both subjects of the King of Great Britain, and residents of the town of Shawinigan Falls, in the Province of Quebec and Dominion of Canada, have invented certain new and useful Improvements in Methods of Making Aldehyde Ammonia, of which the following is a full, clear, and exact description of the invention.

This invention relates to improvements in process of making an aldehyde ammonia, and the object of the invention is to provide for the manufacture in an extremely inexpensive and economical manner.

A further object is to provide a continuous process.

In previously disclosed processes for the manufacture of aldehyde ammonia by bringing together the chosen aldehyde and ammonia in a vehicle or solvent, it has apparently been considered necessary or advisable to employ a solvent in which the aldehyde dissolves readily but in which the aldehyde ammonia is insoluble or only slightly soluble, in order to facilitate the removal of the aldehyde ammonia. The imposition of such conditions necessitates for practical reasons the use of organic solvents.

According to the present invention, the aldehyde and ammonia are brought together in a water vehicle and the aldehyde ammonia formed dissolves in the water until a saturated solution results. After saturation all further aldehyde ammonia formed appears in crystalline form and may be removed by passing the liquor through a filtering apparatus, which removes the crystals and returns the saturated solution of aldehyde ammonia to the reaction.

In carrying out the invention, the aldehyde may be introduced in either liquid or vaporous form and the ammonia preferably in gaseous form. The liquor is preferably maintained in agitation uring the reaction to promote combination of the aldehyde and ammonia. As the reaction is strongly exothermic, the heat of reaction should be abstracted preferably by external cooling to keep the liquor below 50° C. and preferably below 20° C. if the formation of resin is to be avoided. The aldehyde and ammonia are passed in in about equimolecular amounts. The ammonia is preferably slightly in excess, so that the liquor has a distinct odor of ammonia, but the invention is not limited to this as the aldehyde may be in excess. Obviously the saturation point of the liquor will be reached more quickly at lower temperatures and the commencement of production obtained more quickly. It will be understood, however, that the temperature of the process has no permanent effect on the output except as it affects the rate of combination, unless it is so high as to affect the quality of the product. At higher temperature some aldehyde resin is formed. Therefore, once the saturation point of the liquor is reached, the formation of crystals will proceed and the product will be obtained at a rate proportional to the combination of the aldehyde and ammonia at the temperature. Therefore, to obtain a uniform rate of production, a substantially uniform temperature should be maintained.

The following example will serve to illustrate in greater detail the carrying out of the invention;—

10 gallons of water is placed in a water or brined cooled vessel provided with an agitator and ammonia and acetaldehyde passed in, the water being meanwhile thoroughly agitated. The rate of introduction of the aldehyde is regulated by the indications of a thermometer in the reaction liquor which should not rise above 50° C. and preferable not above 20° C. The admission of ammonia is preferably at such a rate that the odor of ammonia is evident, that is to say, the ammonia is slightly in excess. The acetaldehyde and ammonia combine to produce acetaldehyde ammonia which dissolves in the water. As soon as the concentration of the solution reaches 25% to 35% according to the temperature, the solution is saturated or slightly super-saturated and the acetaldehyde ammonia begins to appear as a fine white crystalline material in suspension. As soon as the suspension reaches the consistency of a thin cream, the liquor is started in circulation through a filtering apparatus, the introduction of acetaldehyde and ammonia being meanwhile continued. The clear filtrate discharging from the filtering apparatus consists chiefly of a saturated solution of acetaldehyde ammonia and is continuously passed back to the reaction vessel. The crystals may be dried in a centrifugal or other dryer and the solvent thus recovered also returned to the reaction.

While the invention has previously been described as a continuous process, it will be understood that it may be carried out equally well as a batch process in a variety of ways. A suitable aqueous solution of aldehyde is prepared and ammonia passed in at a suitable rate, the heat of reaction being abstracted as necessary. Conversely, the process may be started with an aqueous solution of ammonia and aldehyde passed in in liquid or vapor form. Again, starting with water, aldehyde and ammonia may be passed in until the accumulation of crystals reaches the desired amount. In any case, the suspension of aldehyde ammonia crystals in a saturated solution of aldehyde ammonia results. The crystals may be extracted by filtering and fresh supplies of aldehyde and ammonia introduced.

While the process is preferably carried out at ordinary or atmospheric pressures, it will be understood that it may be carried out at either super-atmospheric or sub-atmospheric pressures within such limits as are imposed by the temperature limitations.

While acetaldehyde is the only aldehyde hereinbefore specifically mentioned, it will be understood that the process will work equally well with certain other aldehydes of the same series, such as propylaldehyde, butylaldehyde, etc. yielding propylaldehyde ammonia and butylaldehyde ammonia, etc. respectively.

It will be noted that in the foregoing description, the solvent or vehicle has been referred to as water, whereas when the process is once well under way the solvent is really a saturated aqueous solution of the aldehyde ammonia which is being formed. No distinction has been made between the pure solvent and the saturated solution as both serve equally well the purpose of a vehicle for the aldehyde.

Having thus described our invention, what we claim is:—

1. A process for the manufacture of an aldehyde ammonia, which embodies passing a fatty aldehyde and ammonia in substantially equimolecular amounts into an aqueous medium.

2. A process of making an aldehyde ammonia, which embodies passing a fatty aldehyde and ammonia into an aqueous medium, the amount of ammonia present in the reaction being at no time more than slightly in excess of the amount combinable with the aldehyde.

3. A process of making an aldehyde ammonia, which embodies passing a fatty aldehyde and ammonia into water until a saturated solution of aldehyde ammonia results, and then continuing introduction of aldehyde and ammonia with formation of crystalline aldehyde ammonia in its saturated solution, and removing the crystalline product from the solution.

4. A process according to claim 3, in which the crystalline product is removed during the introduction of the aldehyde and ammonia.

5. A process according to claim 3, in which for operation at atmospheric pressure the temperature is maintained below 50° C.

6. A process of making an aldehyde ammonia, which embodies passing a fatty aldehyde and ammonia in substantially combining proportions into an aqueous medium.

7. A process of making an aldehyde ammonia, which embodies passing a fatty aldehyde and ammonia in substantially combining proportions into a saturated aqueous solution of aldehyde ammonia.

8. A process of making an aldehyde ammonia, which embodies passing a fatty aldehyde and ammonia in substantially combining proportions into a saturated aqueous solution of aldehyde ammonia while maintaining the temperature below 50° C. for operations at atmospheric pressure.

9. A process of making an aldehyde ammonia, which embodies passing a fatty aldehyde and ammonia in substantially combining proportions into a saturated aqueous solution of aldehyde ammonia and removing the crystalline product resulting.

10. A continuous process of making an aldehyde ammonia, which embodies continuously passing a fatty aldehyde and ammonia in substantially combining proportions into a saturated aqueous solution of aldehyde ammonia, and separating crystalline aldehyde ammonia from the solution.

11. A continuous process of making an aldehyde ammonia, which embodies continuous passing a fatty aldehyde and ammonia into a saturated aqueous solution of aldehyde ammonia and removing from the solution the crystalline aldehyde ammonia formed therein.

12. A continuous process of making an aldehyde ammonia which embodies passing a fatty aldehyde and gaseous ammonia in substantially equimolecular proportions into a saturated aqueous solution of aldehyde ammonia while maintaining the temperature below 50° C. for operations at atmospheric pressure and separating crystalline aldehyde ammonia from the solution.

In witness whereof, we have hereunto set our hands.

FREDERICK W. SKIRROW.
GEORGE O. MORRISON.